United States Patent
Ou-Young

(10) Patent No.: US 6,183,171 B1
(45) Date of Patent: Feb. 6, 2001

(54) FOOD MATERIAL SHAPING CUTTER

(76) Inventor: Robert Ou-Young, 5F, No. 52, Lane 148, Li-De Street, Chung Ho City, Taipei Hsien (TW)

( * ) Notice: Under 35 U.S.C. 154(b), the term of this patent shall be extended for 0 days.

(21) Appl. No.: 09/377,673

(22) Filed: Aug. 19, 1999

(30) Foreign Application Priority Data

Sep. 30, 1998 (TW) ................................................ 87216224

(51) Int. Cl.⁷ .................................................. A21C 11/10
(52) U.S. Cl. ............................ 407/67; 407/113; 407/114; 425/308
(58) Field of Search ............................ 407/67, 113, 114; 82/54, 56, 57, 138; 425/308, 132, 142, 287, 461, 466, 465, 426

(56) References Cited

U.S. PATENT DOCUMENTS

| | | | |
|---|---|---|---|
| 4,552,492 | * 11/1985 | Komanduri et al. | 407/114 |
| 4,734,024 | * 3/1988 | Tashiro | 425/132 |
| 4,767,305 | * 8/1988 | Tashiro | 425/308 |
| 5,031,520 | * 7/1991 | Tsay | 99/353 |
| 5,223,277 | * 6/1993 | Watanabe et al. | 425/132 |
| 5,820,890 | * 10/1998 | Kobayashi | 425/133.1 |

* cited by examiner

Primary Examiner—Henry Tsai
(74) Attorney, Agent, or Firm—Pro-Techtor Inter-National Services

(57) ABSTRACT

A set of shaping cutters for cutting food material into a shaped body composed of an outer covering layer and an inner filling ; and being characterized in each shaping cutter having substantially triangular front working face formed of two trapezoidal slopes and a cutting edge connected between the trapezoidal slopes, the trapezoidal slopes each having a plurality of protruding portions and a transversely extended recessed portion between each two adjacent protruding portions.

1 Claim, 6 Drawing Sheets

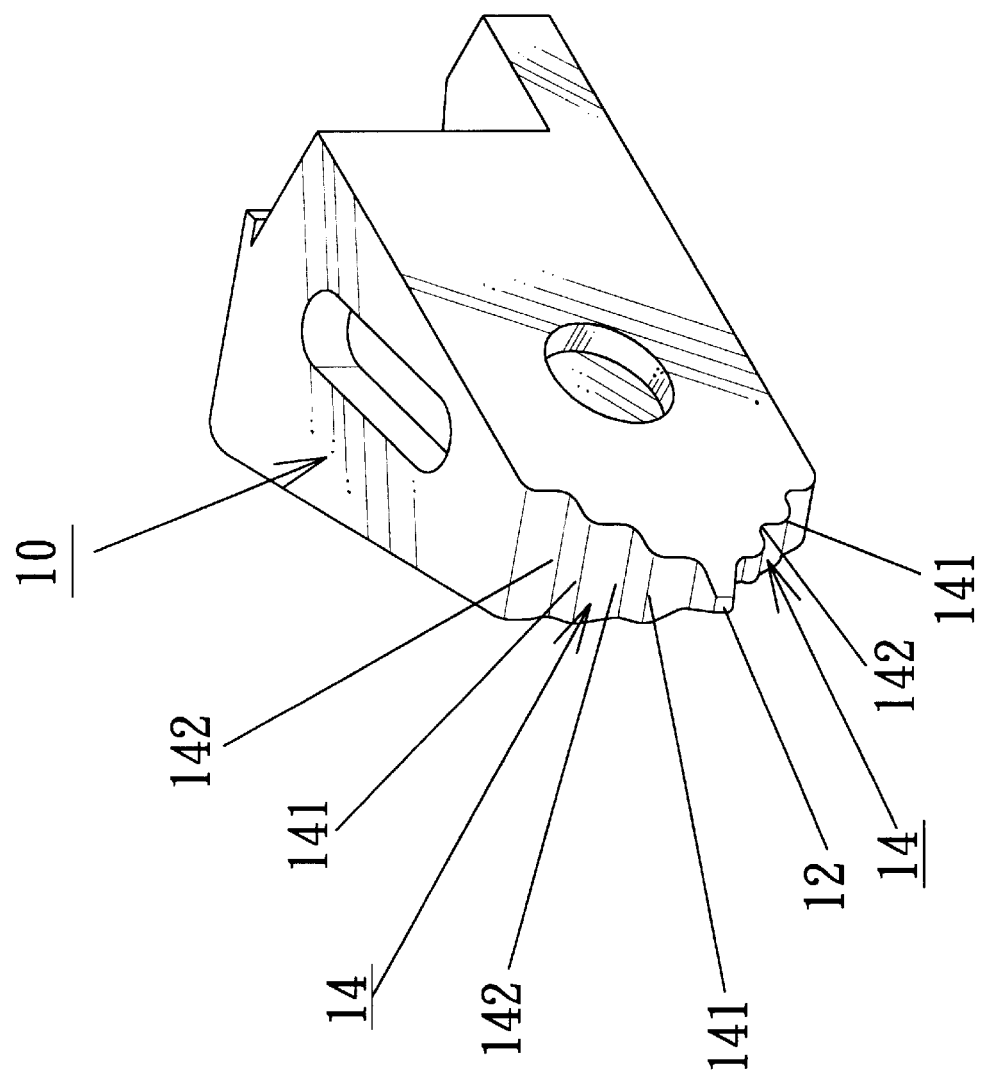
FIG:1

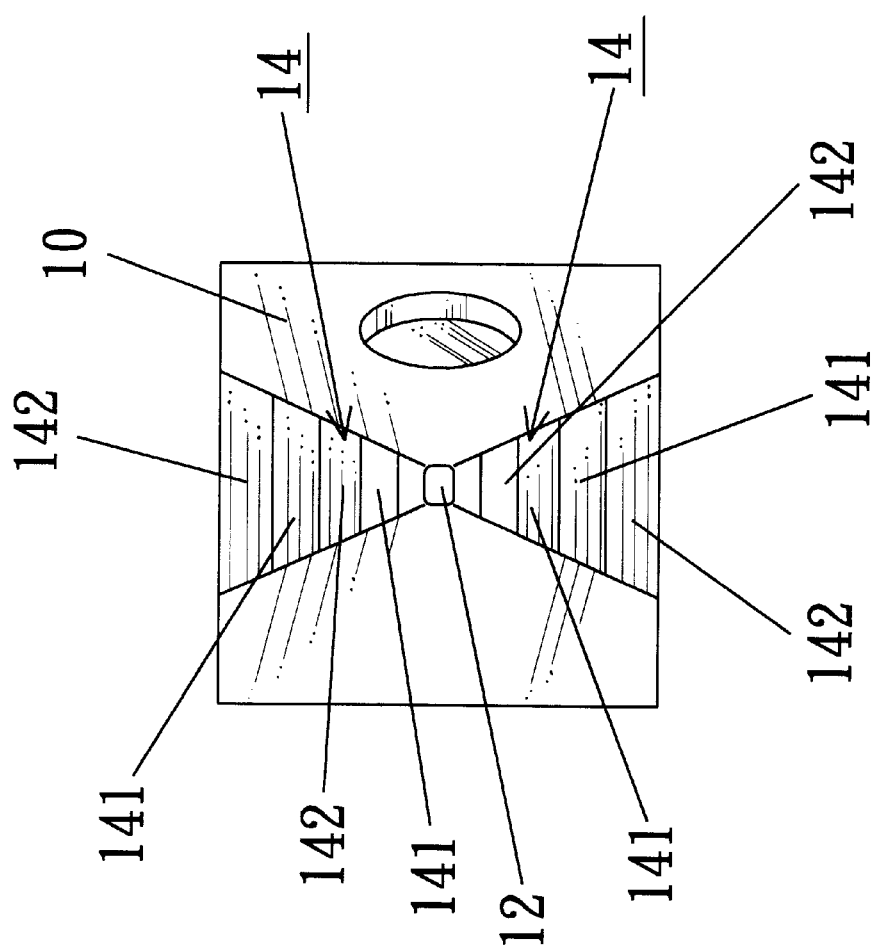
FIG:2

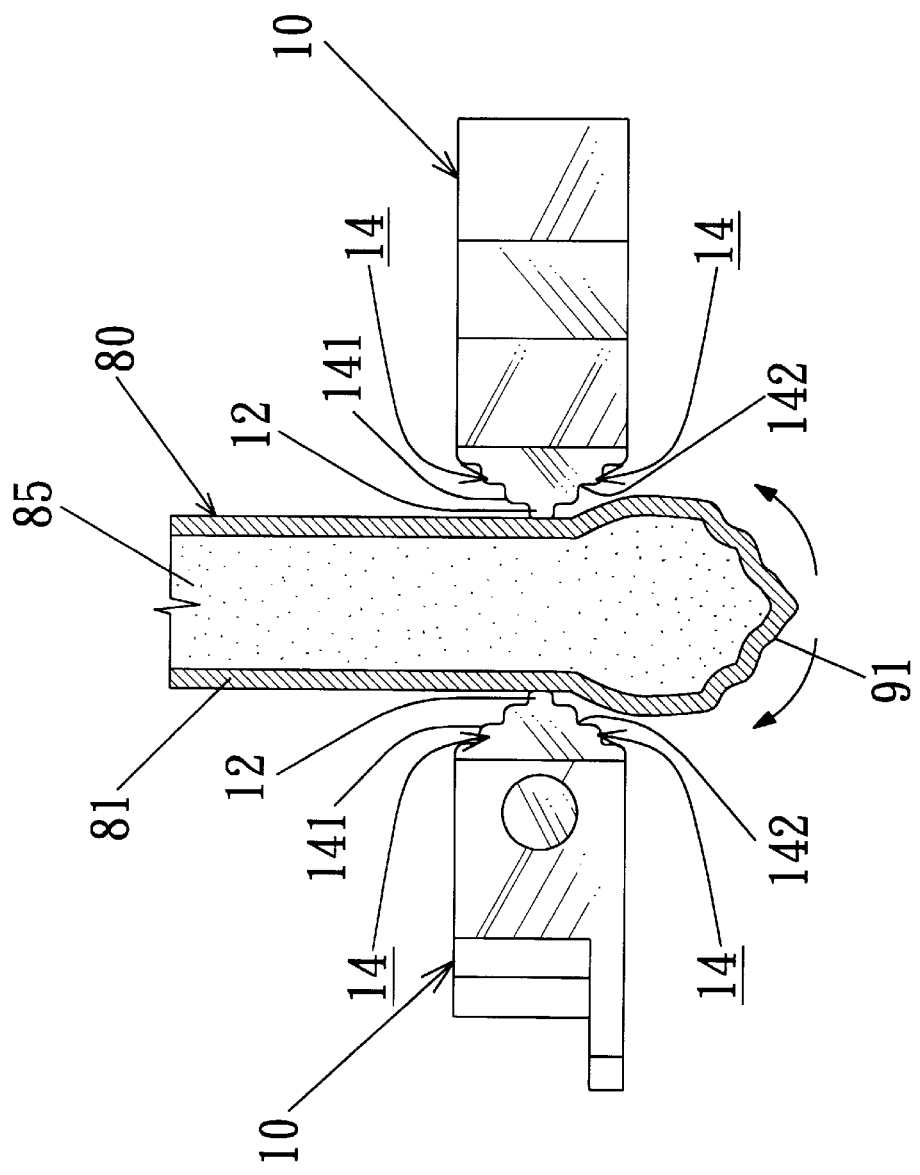
FIG:3

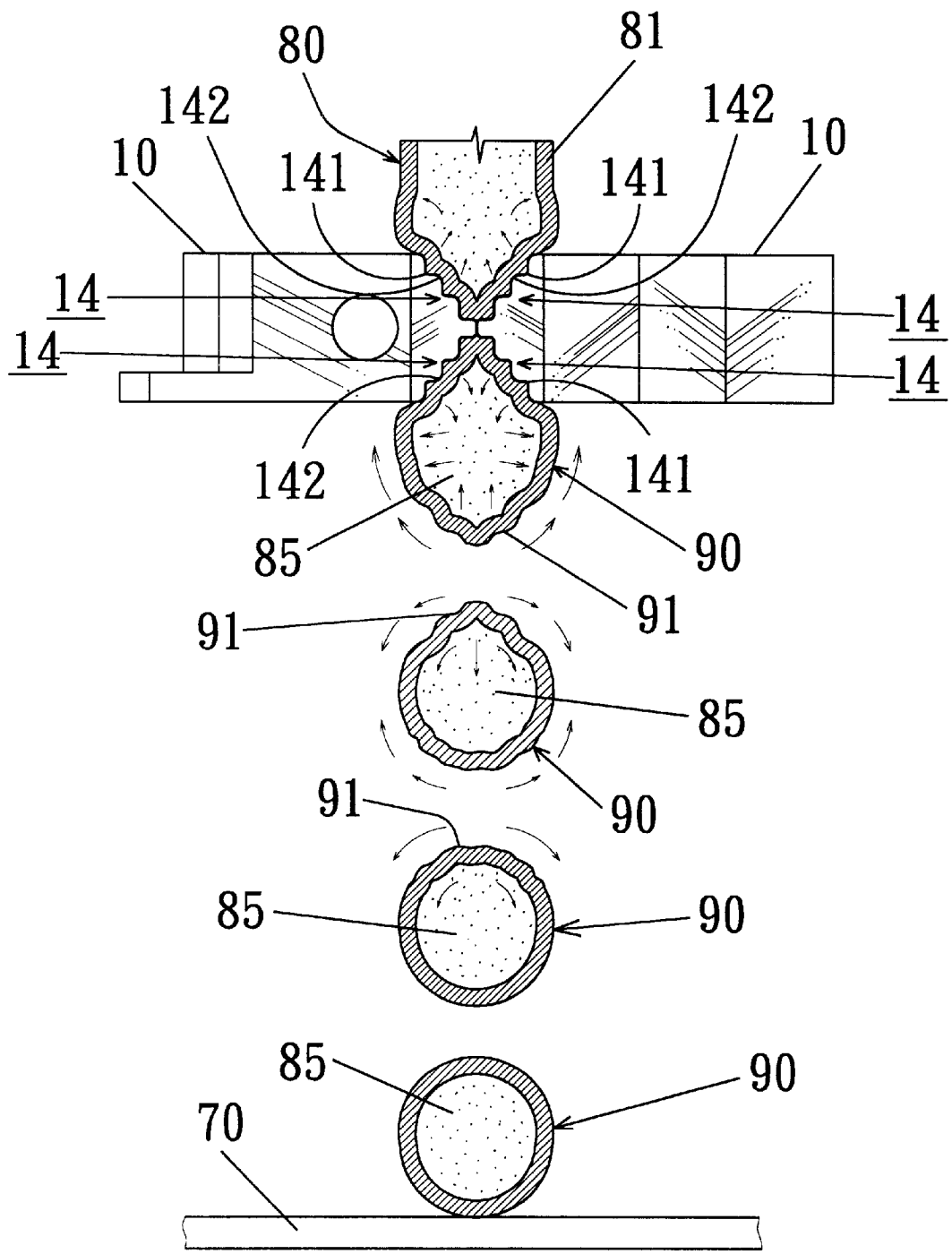
FIG:4

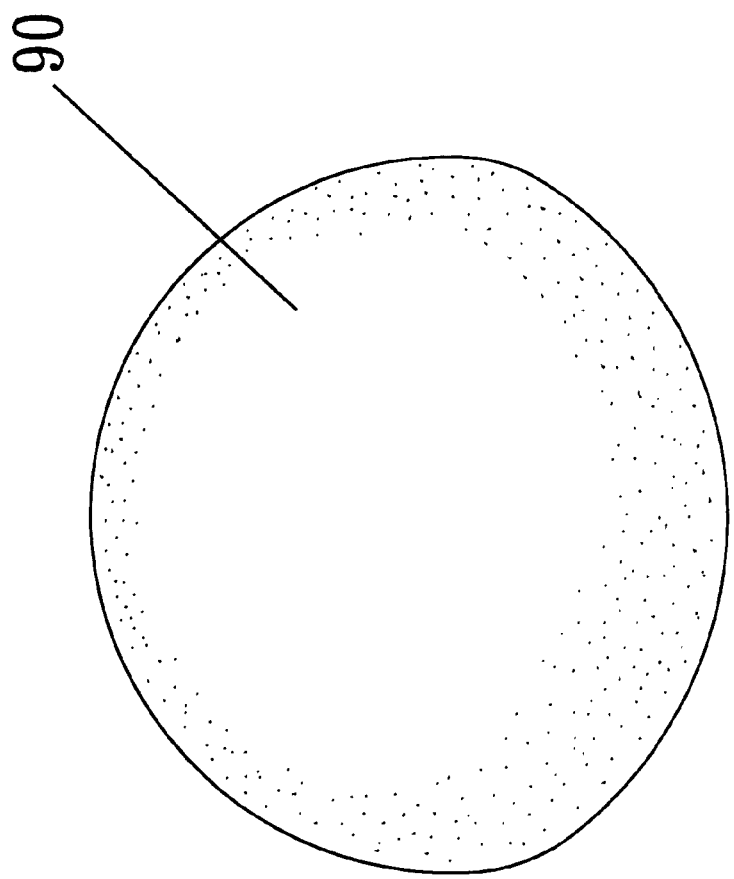
FIG:5

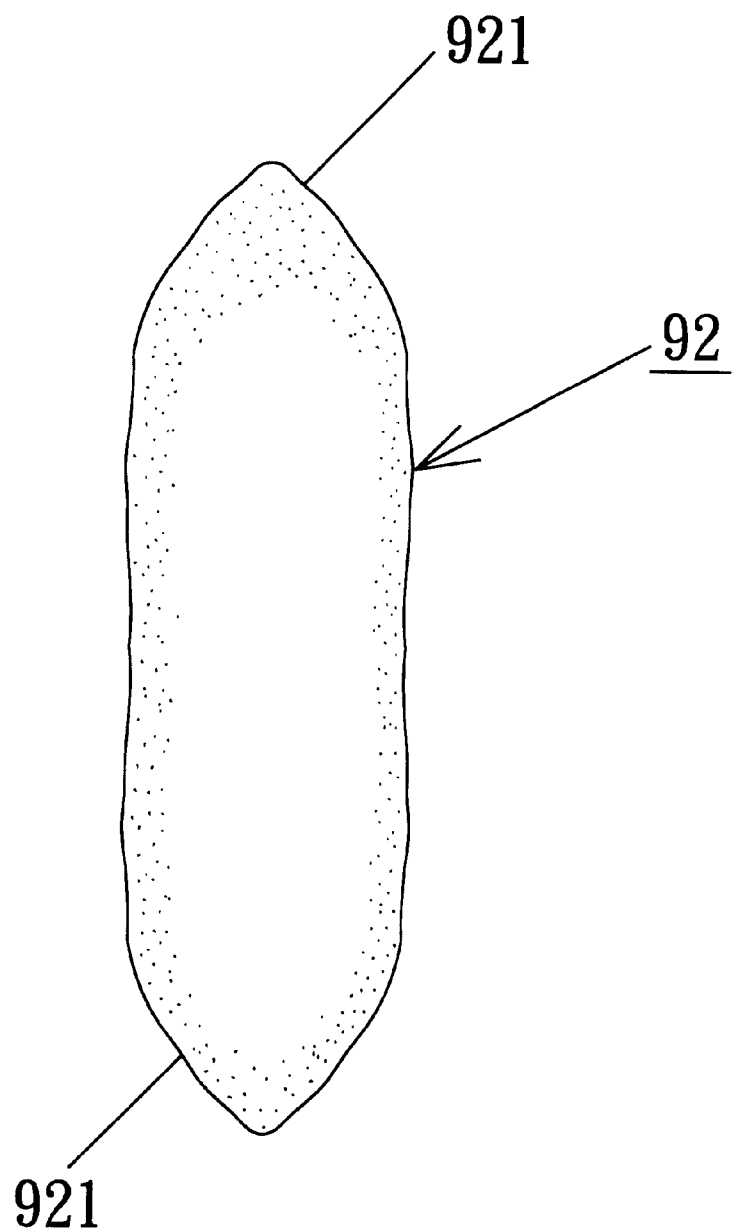
FIG:6

FOOD MATERIAL SHAPING CUTTER

BACKGROUND OF THE INVENTION

The present invention relates to a food material shaping cutter for cutting food material into a shaped body composed of an outer covering layer and an inner filling, and more particularly to such a food material shaping cutter which is practical for cutting food material of different elasticity into a spherical body as well as a cylindrical body.

Various apparatus have been disclosed for shaping a spherical body. Exemplars are seen in U.S. Pat. Nos. 4,883,678; 4,767,304; 4,734,024. According to these disclosures, cutter members slide on each other to shape a spherical body consisting of dough crust and a filling from a continuously fed cylindrical body. Each of the cutter members has a tapered portion adjacent to an edge formed at the corner where two adjoining slide surfaces meet. Because the top and bottom side walls of the edge slope at a sloping angle, the sloping top and bottom side walls give little pressure to the fed cylindrical body when cutting, and the filling tends to be exposed to the outside.

SUMMARY OF THE INVENTION

The present invention provides a food material shaping cutter, which enables the filling to be squeezed upwards and downwards from the cutting edge in reversed directions, so that the filling is maintained on the inside when a spherical or cylindrical body is shaped.

BRIEF DESCRIPTION OF THE DRAWINGS

FIG. 1 is a perspective view of a food material shaping cutter according to the present invention.

FIG. 2 is a front view of the food material shaping cutter shown in FIG. 1.

FIG. 3 is a plain view showing a highly elastic cylindrical body passed through the opening between two food material shaping cutters according to the present invention.

FIG. 4 shows the food material shaping cutters closed, the continuously fed cylindrical body cut, a spherical body formed.

FIG. 5 is a perspective view of a spherical body according to the present invention.

FIG. 6 is a perspective view of a cylindrical body according to the present invention.

DETAILED DESCRIPTION OF THE PREFERRED EMBODIMENT

Referring to FIGS. 1 and 2, a food material shaping cutter 10 is shown for shaping elastic food material into a cylindrical or spherical body 90. The food material shaping cutter 10 comprises a substantially triangular front working face formed of two trapezoidal slopes 14 and a cutting edge 12 connected between the trapezoidal slopes 14. The trapezoidal slopes 14 each comprise a plurality of plurality of protruding portions 141 and a transversely extended recessed portion 142 between each two adjacent protruding portions 141.

Referring to FIGS. 3 and 4, when a highly elastic (less water content) cylindrical body 80, which is composed of an outer covering layer 81 and an inner filling 85, passes through the opening between two food material shaping cutters 10, the cutting edge 12 of each food material shaping cutter 10 touches the outer covering layer 81 of the highly elastic cylindrical body 80. When the food material shaping cutters 10 are closed, the highly elastic cylindrical body 80 is cut by the cutting edge 12 of each food material shaping cutter 10, and the cylindrical body 80 is squeezed by the protruding portions 141, causing the filling 85 to be moved upwards and downwards from the cutting edge 12 of each food material shaping cutter 10 in reversed directions, preventing the filling 85 to be gathered around the cutting edge 12 of each food material shaping cutter 10. The duly cut spherical body 90 has a concave convex outer surface 91, however due to the contraction effect of the material property of dough, the concave convex outer surface 91 disappears quickly when the cut spherical body 90 falls to a conveyer 70. Because the protruding portions 141 are formed integral with the slopes 14, the filling 85 are smoothly squeezed outwards from the cutting edge 12 of each food material shaping cutter 10 in reversed directions without causing the outer covering layer 81 to be abnormally deformed. Furthermore, because the cutting edge 12 has a short length, it does not severely damage the cylindrical body 80 when cutting. Therefore, when the two food material shaping cutters 10 are moved apart, the filling 85 is still maintained on the inside, and the outer surface of the shape-formed spherical body 90 is maintained smooth.

Referring to FIG. 6, when a less elastic (high water content) cylindrical body, which is composed of an outer covering layer and an inner filling, is shaped by food material shaping cutters of the present invention to form a cylindrical body 92, the two opposite ends 921 of the cylindrical body 92 are maintained in a substantially conical shape to prohibit the inner filling from escaping out of the outer covering layer.

As indicated above, the shaping cutter of the present invention is practical for shaping dough of different elasticity.

What the invention claimed is:

1. A shaping cutter tool adapted to cut food material into a shaped body composed of an outer covering layer and an inner filling comprising:

a pair of shaping cutters, each of said shaping cutters comprising a pair of substantially triangular front working faces, each said working faces being formed from a plurality of terraced trapezoidal surfaces, and leading edges of said working faces meeting to form a cutting surface of said cutter; such that said shaping cutters contact and form the food material adjacent to a cutting area, so that the food material temporarily has a terraced shape conforming to that of said working faces.

* * * * *